(No Model.)
H. F. GANON.
VEHICLE WHEEL GUARD.
No. 580,642. Patented Apr. 13, 1897.
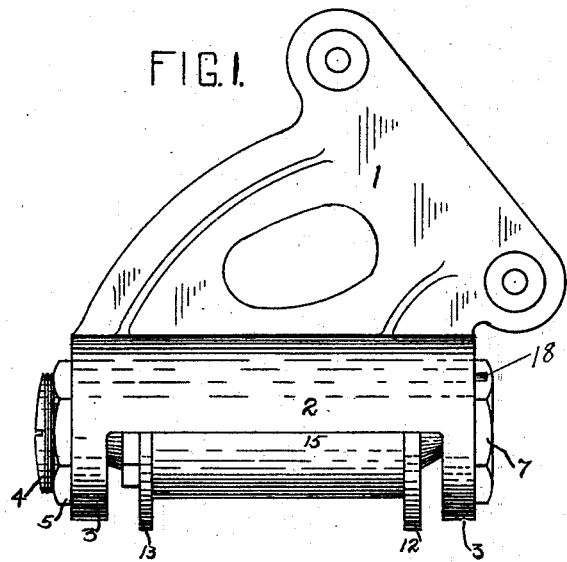
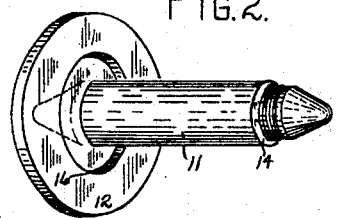
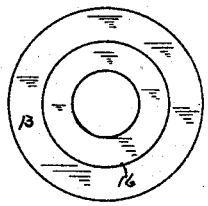
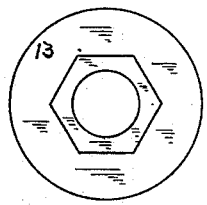
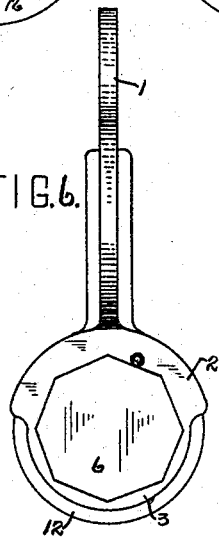
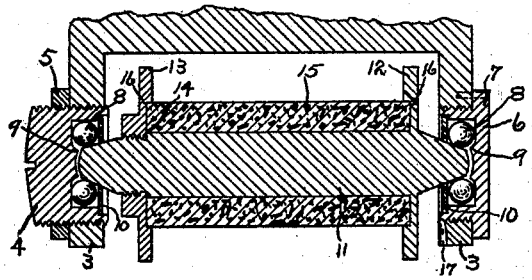
WITNESSES:
Horace B Jones
Zula Green
INVENTOR
Henry F. Ganon
BY
V. H. Lockwood
his ATTORNEY.

UNITED STATES PATENT OFFICE.

HENRY F. GANON, OF INDIANAPOLIS, INDIANA, ASSIGNOR OF ONE-HALF TO WILLIAM TRON, OF SAME PLACE.

VEHICLE-WHEEL GUARD.

SPECIFICATION forming part of Letters Patent No. 580,642, dated April 13, 1897.

Application filed July 29, 1896. Serial No. 601,001. (No model.)

*To all whom it may concern:*

Be it known that I, HENRY F. GANON, of Indianapolis, county of Marion, and State of Indiana, have invented a certain new and useful Vehicle-Wheel Guard; and I do hereby declare that the following is a full, clear, and exact description thereof, reference being had to the accompanying drawings, in which like figures refer to like parts.

My invention relates to a vehicle-wheel guard which is intended to be attached to the bed or body of buggies or other vehicles for the tires of the front wheels to rub against when the vehicle is turning. The immovable rub-iron heretofore generally used is cut by the angle of the tire when the vehicle is clamped, the tire often cutting through the rub-iron into the bed or body of the vehicle and injuring the same. Furthermore, when the vehicle is cramped the friction between the tire and rub-iron is so great that the two are practically locked together, which is liable to cause the overturning of the vehicle or crushing of the wheel or bed of the vehicle. Such rub-iron after it has become notched scratches and injures the fellies of the wheels seriously.

The full nature of my invention will appear from the accompanying drawings and the description and claims following.

In the drawings, Figure 1 is a plan view of my wheel-guard. Fig. 2 is a perspective of the shaft or pin. Fig. 3 is a plan view of the inner side of the movable collar or washer on the shaft. Fig. 4 is an outside view of the same. Fig. 5 is a longitudinal horizontal section through the shaft and its bearings. Fig. 6 is an end view of the right-hand end of the device as shown in Fig. 1.

To the bed or body of the vehicle, at the point where rub-irons have usually heretofore been placed, I secure the metallic frame 1, made, preferably, in the form shown in Fig. 1, having the semicircular casing 2, carrying on each end an ear 3. The ears 3 are provided with threaded apertures to receive the bearings.

The bearings which I have shown here consist of a hollow cap. One of these, 4, is preferably provided with a slot for a screw-driver. This is externally threaded to be screwed into the threaded apertures of the ears and is held in place by the nut 5. The other cap, 6, is preferably screw-threaded for a portion of its width and has a nut or head 7 integral with it. It is likewise screwed into the aperture in the ear and is held in place by the removable pin 18, while the adjustment is provided for through the cap 4. Each of these caps 4 and 6 are hollowed out, preferably in the form shown in Fig. 5, to receive the balls. In the middle of the hollowed-out portion there is an annular ridge 9, which, together with the washer 10, holds the balls in place and forms a race for them. The washer 10 is seated in the caps after the balls are placed and is held therein by battering down the surrounding rim of the cap at two or three places over the washer, whereby it cannot escape. It can be secured in any other manner desired. Between the annular ridge 9 the surface of the cap is scooped or hollowed out somewhat, as shown in Fig. 5. The shaft 11 is preferably provided with conical ends, as shown, that fit in the bearings just described, the diameter of the shaft being greater than the diameter of the bearings. Near one end and integral with such shaft I provide a collar 12, and near the other end I turn down the shaft for a slight distance and thread such portion to receive the removable collar 13. The threads in such turned portion of the shaft do not extend entirely to the shoulder 14, so that the collar when turned tightly into place is strengthened and will not come off until removed. About the shaft 11 I provide a rubber covering 15, whose ends extend into annular grooves 16 in the two collars 12 and 13, as shown in Fig. 5, whereby the ends of the rubber are protected.

It is obvious that the antifriction-bearings herein shown might be inserted in the ends of the shaft, while conical-ended bolts might be inserted in the threaded apertures of the ears of the frame, thus reversing the bearing arrangement, but not in any manner altering the efficiency of my device. I might also add that both caps might be like the cap 4 instead of what is shown. In one ear I cut out on the inside a horizontal groove, as seen at 17, to permit the insertion and removal of the shaft 11. Attention is also called to the function of the semicircular casing 2, which is not only for the purpose of supporting the ears 3, but also to prevent the ears separating, for the slightest spreading of such ears would permit the escape of the shaft 11 when the vehicle is cramped.

What I claim as my invention, and desire to secure by Letters Patent, is—

1. In a vehicle-wheel guard, an antifriction-bearing comprising a suitable cap with an annular ridge located within the cavity centrally, a ring washer in the outer portion of the cavity whereby within the cavity between the annular ridge and the washer a ball-race is formed, and a series of balls within such race.

2. A vehicle-wheel guard comprising a frame to be secured to the bed of the vehicle and provided with a semicylindrical casing with opposing ears at each end containing screw-threaded apertures, caps externally threaded to fit in such apertures, means for adjusting and holding such caps in place, a series of balls carried in such caps to form a ball-bearing, and a roller consisting of a body portion with collars at each end one of which is removably secured, such roller having conical ends that fit in said ball-bearings, substantially as and for the purpose shown and described.

In witness whereof I have hereunto set my hand this 6th day of June, 1896.

HENRY F. GANON.

Witnesses:
V. H. LOCKWOOD,
ZULA GREEN.